United States Patent
Marr et al.

(10) Patent No.: US 7,831,838 B2
(45) Date of Patent: Nov. 9, 2010

(54) PORTION-LEVEL IN-MEMORY MODULE AUTHENTICATION

(75) Inventors: Michael David Marr, Sammamish, WA (US); Scott A. Brender, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1035 days.

(21) Appl. No.: 10/795,068

(22) Filed: Mar. 5, 2004

(65) Prior Publication Data

US 2005/0198051 A1  Sep. 8, 2005

(51) Int. Cl.
*G06F 11/30* (2006.01)

(52) U.S. Cl. .................. 713/187; 717/168; 717/172; 726/22

(58) Field of Classification Search .......... 713/176, 713/187, 191; 717/168–178; 726/22, 24, 726/25

See application file for complete search history.

(56) References Cited

U.S. PATENT DOCUMENTS

| | | | | | |
|---|---|---|---|---|---|
| 5,339,430 | A | * | 8/1994 | Lundin et al. | 719/332 |
| 5,530,757 | A | * | 6/1996 | Krawczyk | 713/188 |
| 5,625,693 | A | * | 4/1997 | Rohatgi et al. | 713/187 |
| 5,757,914 | A | * | 5/1998 | McManis | 713/187 |
| 5,768,382 | A | * | 6/1998 | Schneier et al. | 380/251 |
| 5,907,619 | A | * | 5/1999 | Davis | 713/176 |
| 5,944,821 | A | * | 8/1999 | Angelo | 726/22 |
| 5,970,143 | A | * | 10/1999 | Schneier et al. | 713/181 |
| 6,105,137 | A | | 8/2000 | Graunke et al. | |
| 6,484,315 | B1 | * | 11/2002 | Ziese | 717/173 |
| 6,546,487 | B1 | * | 4/2003 | McManis | 713/169 |
| 6,560,776 | B1 | * | 5/2003 | Breggin et al. | 717/176 |
| 6,681,329 | B1 | * | 1/2004 | Fetkovich et al. | 713/189 |
| 6,715,116 | B2 | * | 3/2004 | Lester et al. | 714/718 |

(Continued)

OTHER PUBLICATIONS

Catuogno, L. et al., "A Format-Independent Architecture for Run-Time Integrity Checking of Executable Code", *Dipartimento di Informatica ed Applicazioni, Universita di Salerno*, Baronissi (SA) Italy, *third Conference on Security in Communication Networks*, Sep. 12-13, 2002, 16 pages.

(Continued)

*Primary Examiner*—Kimyen Vu
*Assistant Examiner*—April Y Shan
(74) *Attorney, Agent, or Firm*—Woodcock Washburn LLP

(57) ABSTRACT

Dynamic run-time verification of a module which is loaded in memory (in whole or in part) for execution is enabled by storing hashes of smaller portions of the module (e.g. page-level hashes) as they should look when loaded into memory for execution. After an initial authentication is completed, hashes of smaller portions of the module are stored. These hashes consist of the portion of memory as modified by changes which would be made by the operating system loader operating normally. Thus, the hashes can be used to verify that the portion as loaded into memory for execution is 1) a correct copy of the portion of the software module, 2) correctly modified for execution by the processor, and 3) not tampered with since loading. Additionally, during execution of the module, new portions/pages of the module which are loaded can be verified to ensure that they have not been changed, and a list of hot pages of the module can be made, including pages to be continually re-verified, in order to ensure that no changes have been made in the module.

21 Claims, 3 Drawing Sheets

U.S. PATENT DOCUMENTS

| | | | |
|---|---|---|---|
| 6,854,645 B1 * | 2/2005 | Somers et al. | 235/379 |
| 6,961,852 B2 | 11/2005 | Craft | |
| 7,103,779 B2 * | 9/2006 | Kiehtreiber et al. | 713/187 |
| 7,197,545 B1 * | 3/2007 | Davie | 709/220 |
| 7,325,126 B2 | 1/2008 | Ivanov et al. | |
| 7,356,815 B2 * | 4/2008 | Sarfati et al. | 717/168 |
| 7,412,480 B2 * | 8/2008 | Baentsch et al. | 709/203 |
| 7,644,287 B2 | 1/2010 | Oerting et al. | |
| 2002/0194484 A1 * | 12/2002 | Bolosky et al. | 713/189 |
| 2003/0172370 A1 | 9/2003 | Satuloori et al. | |
| 2004/0243807 A1 * | 12/2004 | Hughes et al. | 713/176 |
| 2005/0010767 A1 | 1/2005 | Craft | |
| 2005/0188214 A1 * | 8/2005 | Worley et al. | 713/187 |
| 2005/0198517 A1 | 9/2005 | Ivanov et al. | |

OTHER PUBLICATIONS

Ko, C. et al., "Detecting and Countering System Intrusions Using Software Wrappers", *Proceedings of the 9th USENIX Security Symposium*, Aug. 14-17, 2000, Denver, Colorado.

Lee, C.H. et al., "A Novel Application of the Phone Card and Its Authentication in Mobile Communications", Journal of Information Science and Engineering, 1999, 15(4), 471-484.

Ross, M. et al., "ClearTrust takes the Upper Hand in Web-Based Authentication", Network Computing, 2000, 11(11), 58.

Impson, J., "Modular Authentication for Linux", Network Computing, 13(5), Mar. 4, 2002, 92-97.

* cited by examiner

PORTION-LEVEL IN-MEMORY MODULE AUTHENTICATION

FIELD OF THE INVENTION

The present invention relates generally to the field of computing, and, more particularly, to the authentication of a software module.

BACKGROUND OF THE INVENTION

Generally, computer applications run by executing code. The code controls the actions of the computer systems on which it is run. In order to protect the application from unauthorized tampering with the code, a number of security precautions may be utilized.

Some of these security measures are physical. For example, a user purchasing software on a CD-ROM may be able to verify that the CD-ROM is a legitimate copy of the software by inspecting holograms or other security devices on the packaging.

Module authentication is a security measure that executes on a computer system and attempts to ensure the security of software applications by providing a level of protection against tampering.

Static module authentication is a mechanism to detect tampering of the portable executable binary modules that comprise a software application. These binary modules are stored on the persistent storage device, which is usually a file on a hard disk and therefore often referred to as the "on-disk" image of the module. Authentication of the on-disk image may be accomplished by cryptographically hashing the file and comparing the result to a precomputed hash of the file. A cryptographic hashing algorithm operates on binary data of arbitrary size and generates a fixed size value known as a hash. Cryptographic hashes are computed such that any modification of the hashed data will cause a change in the generated hash. A hash is computed of the on-disk module. It is almost completely impossible to make a modification of a file to insert malicious change and yet maintain the same hash of the modified file. Therefore, the hash of a file can be compared to a stored hash in order to verify that no modifications have been made. In order to prevent an adversary from changing the stored precomputed hash as well as the module being validated, the validity of the stored hash must be verifiable. For example, the stored hash may be cryptographically signed by a trusted signatory.

However, in order to be executed, a file constituting the portable executable (PE) computer program module (e.g. a DLL or EXE) must be loaded into memory. Once loaded, the in-memory module image is subject to potentially malicious modifications such as code patching, detouring and software debugger breakpoints. Consequently, it is necessary to authenticate the in-memory image of the module as well as the on-disk image. Authentication of this in-memory executable image of the file is known as "In-memory authentication" or "dynamic module authentication".

Since tampering of the in-memory images of application modules can occur at any time during the life of the application session, it is usually desirable from a security standpoint to repeat the in-memory authentication process multiple times.

There are two significant reasons why computing a file hash is not an efficient basis for repeated verification of the in-memory module image. First, working set optimizations may be performed by the operating system or by the program itself which cause not all of a file to be loaded into memory at any given time. This is done to reduce the memory footprint of the running process, for example, so that many processes can run on a computer with limited memory and not cause page swapping. It also minimizes the use of memory bus and device I/O bandwidth (for example, to the hard disk) consumed by subsequent page swapping. Memory and bandwidth are valuable fixed resources dictated by the hardware configuration of the computer, so a reduction in the use of either improves the behavior of the computer on all running applications. However, each time a whole file hash must be computed, the entire file must be loaded into physical memory. This negates the benefit of any working set optimizations performed by the operating system or the program itself because the entire module image is swapped from disk into memory.

A second reason is that a module's in-memory image is not identical to its on-disk image and the differences must be accounted for when comparing to a file hash. For example, relocations may be applied to the in-memory image by the operating system. On-disk, the PE file is stored as if it will be loaded at its preferred base address in memory. However, if there is an address collision with a module that has already been loaded at the preferred address, the operating system must relocate, or "rebase", the module to a new location. When this rebasing does occur, all addresses which assumed the original preferred address (that is, the "absolute addresses") within the module image need to change to reflect the base address where the PE file is actually loaded. The PE file contains relocation data which describes where these relocations must be applied. The operating system (OS) loader applies the relocations to the addresses specified in the relocation data. Additionally, the import address table (IAT) in a PE will be modified by the OS loader as function addresses are resolved against DLL export tables. The IAT describes the locations of functions in other modules. When the PE is loaded by the OS, the IAT is changed from the original on-disk version of the PE to reflect the actual locations of functions outside of the PE.

There are multiple methods for performing an in-memory authentication based on a file hash. Each suffers from the inefficiencies mentioned previously. One method is to read the entire on-disk image into memory to compute its hash, compare the hash to the stored signed hash, apply loader changes to the copy and finally compare the copy to the in-memory image. Another method would be to back out loader changes from the in-memory image into another portion of memory, hash that memory and then compare the hash to the signed file hash. Both methods involve three basic tasks: 1) the in-memory image must be swapped into physical memory, 2) a copy of the image must be made in memory and 3) the expected differences between the in-memory image and the on-disk image caused by the operating system loader must be accounted for. These basic tasks are extremely inefficient, in terms of computation, transfer time, and memory allocation.

In view of the foregoing, there is a need for a system that overcomes the drawbacks of the prior art.

SUMMARY OF THE INVENTION

The present invention allows an efficient method for in-memory verification of an executable object code file, for example a PE (portable executable) file.

When the first verification of the PE file is required, the PE file is read from the disk to memory, loader changes are applied, and the static hash is computed, and compared to the signed precomputed static hash that shipped with the module.

According to the invention, individual dynamic hashes for smaller sections of memory are computed from the static image after the loader logic has been applied. These smaller region hashes are compared against similar hashes computed for corresponding regions of the OS in-memory image of the executable. That is, instead of requiring a single monolithic hash to be computed for the dynamic image, hundreds or thousands of small region hashes are computed and used for authentication of smaller sections of the in-memory image. These smaller region hashes can be used for later re-verification of portions of the PE loaded in memory. In addition, rather than immediately swapping the entire module into physical memory to compute a monolithic hash, the verification can be amortized over the application session by performing portion-level comparisons to the small region hashes.

For example, where pages are used as the atomic unit of memory in a system, each page of the PE file as loaded into memory is hashed, and these "page hashes" are stored securely by the dynamic authentication system. After this is accomplished, whenever a page of the OS loaded PE executable needs to be re-verified, the page is hashed and the hash is compared to the stored page hash for that page. Because the page hash reflects the changes the OS loader has made to the PE file, these changes do not need to be backed out of the in-memory page before it is hashed and compared to the stored hash. That is, the page in-memory can simply be hashed and compared to the corresponding page hash.

In one embodiment, an initial verification occurs for all pages that are part of the working set that have been loaded by the OS. In one embodiment, this verification must occur before the PE file is allowed to run. In an alternate embodiment, this verification must occur before certain sensitive functions are executed. In another alternate embodiment, the verification may be amortized over time by checking subsets of pages at different times during execution. Such amortization allows the application to respond to interaction without burdensome delays while still providing continuous tamper resistance.

In one embodiment, a select number of pages are tracked and these pages are reverified each time they are used, or, in an alternate embodiment, at least once in a given period of time. This way, continual verification of sensitive pages being used in the PE is provided.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

A module being loaded from a disk into memory is authenticated in order to ensure that the module loaded contains no corruptions, either in the on-disk version or the in-memory version executing in the process.

In order to ensure that a module loaded from disk into memory is the correct and authentic version of the module, a hash of the file can be checked to ensure that it is correct. This is done separately from the operating system (OS) loading process which will load the module for execution. Once this is accomplished, smaller portions of the file are hashed, in order to create portion-sized verifications which allow the as-loaded software module to be verified, but without requiring that the entire software module be hashed and therefore paged into memory for every verification.

However, changes are made to the software module by the OS loader. Therefore, in order to ensure that the smaller portion-sized verifications do not fail, the smaller portions of the file, before hashing, are changed to incorporate the changes which have been made by the OS loader upon loading the portions into memory for execution. Thus, when a portion was loaded and changed by the OS loader, the hash of that portion will match the hash for that portion computed during the initial verification.

Module authentication is a security feature that helps protect the application execution environment against tampering. When used properly, it provides some level of protection against code patching, redirection and software breakpoints. The level of protection is dependent on the number of modules in the applications process space that are authenticated and the frequency of the authentication.

Exemplary Computing Arrangement

Figure 1:
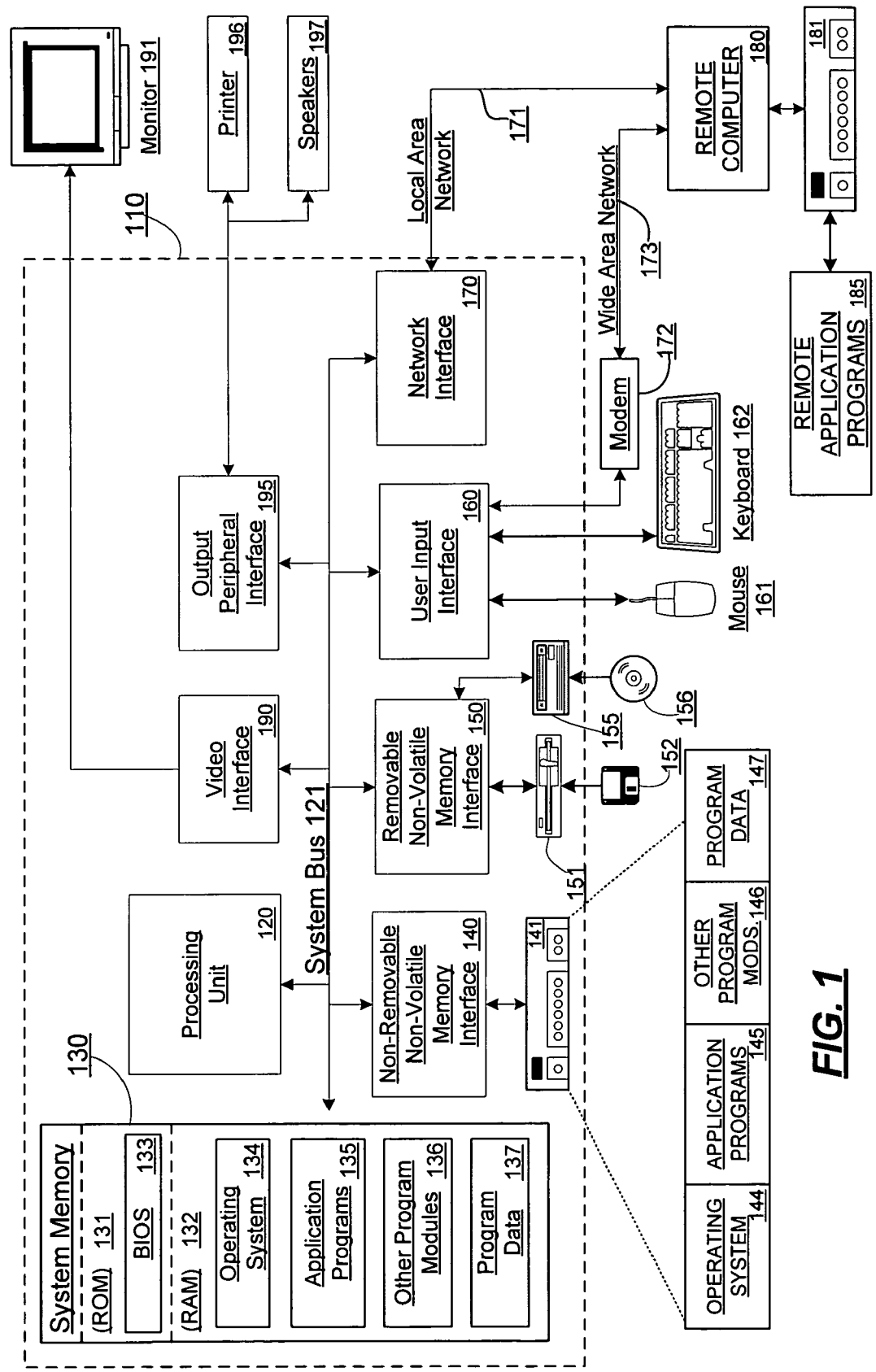
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Loading of a Software Module into Memory

Figure 2:
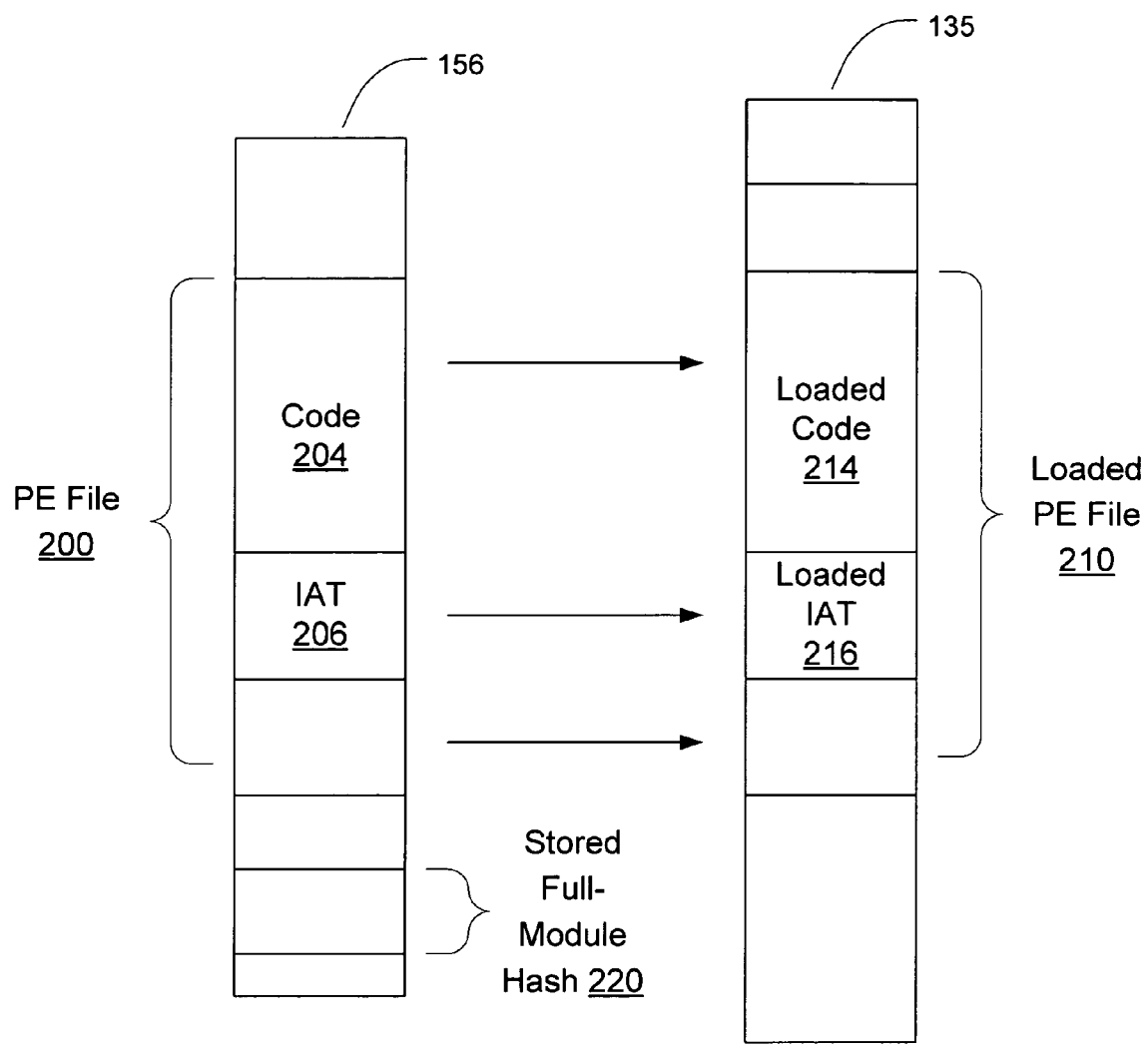
FIG. 2 is a block diagram of the loading of a software module according to one embodiment of the invention.

FIG. 2 shows how a software module such as a portable executable module may be loaded from removable/non-removable, volatile/nonvolatile computer storage media into RAM in system memory for application programs 132. By way of example only, FIG. 2 illustrates the storage media as a nonvolatile optical disk 156, such as a CD ROM, as shown in FIG. 1 and described above.

Generally, PE file 200 contains several different constituent parts. As an example, as shown in FIG. 2, the PE file 200 contains code 204 and an import address table (IAT) 206. Code 204 includes code to be executed. IAT 206 contains the structure for a table which holds the locations of functions in other modules which are called by the PE file 200 in its operation. Because these locations are not known until the PE file 200 is loaded into memory, the IAT 206 as persistently stored will be changed when the PE file 200 is loaded and the location of the functions in other modules are resolved. Additionally, the code 204 may contain absolute addresses which must be updated once it is loaded into memory by the operating system.

Full-Module Verification of a Software Module

Also included on CD ROM 156 is a stored full-module hash 210. The stored full-module hash 210 is a single hash which covers the PE file 200 in its entirety. In order to use the stored full-module hash 210 to verify that PE file 200 loaded into application program RAM 132, all portions of the PE file 200 which have been used to create the full-module hash 210, a copy of the PE file 200 is first read into memory as a PE file. This "raw" PE file copy is not changed, as it is copied byte-for-byte into memory, not loaded by the OS loader into memory. The raw version is hashed, and the hash is compared to the stored full-module hash 210. Other verification means may also be used to perform such full-module verification.

Dynamic Verification of Portions of a Software Module

If this full-module verification is successful, in order to allow continuing dynamic verification of files, hashes are then created for portions of the raw PE file. In one embodiment, these portions are pages of the PE file, since in many computing environments, a page is the atomic unit of memory. Because these hashes are going to be used to verify that pages of the loaded PE file 210 have not been tampered with, changes identical to those which the loader makes to the PE file 200 to create loaded PE file 210 are applied to each portion of the raw PE file before the page hashes are computed. Thus, for example, hashes may be created which can be used to verify each page of loaded code 214. Each of these hashes may be used to verify a portion of the software module as loaded into memory. Thus, at any time during the execution of the PE in system memory 135, a page of the loaded data may be hashed, and the new value of the hash compared to the stored value of a hash for that page which has been stored.

Figure 3:
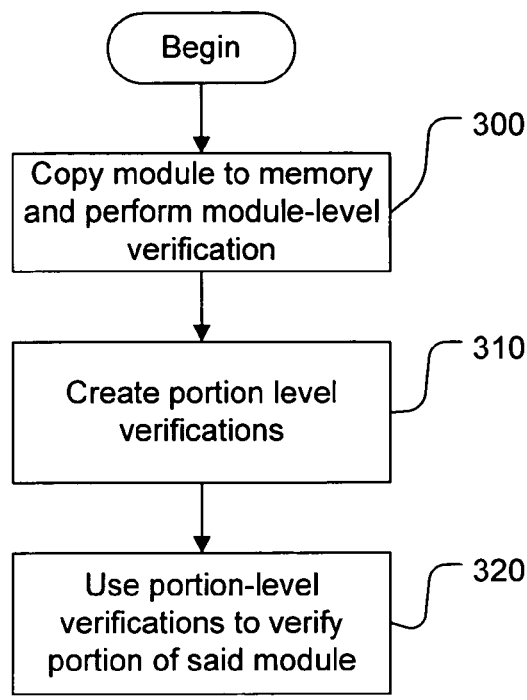
FIG. 3 is a flow diagram of a process of dynamically authenticating a software module in memory according to one embodiment of the invention.

FIG. 3 describes the process of dynamically authenticating a software module in memory. As shown in FIG. 3, first, in step 300, the software module is read into memory, and module-level verification is used to verify that it has not been tampered with. In one embodiment, this module-level verification consists of comparison with a hash, as described. Any other verification which is used to verify that the module has not been tampered with is also contemplated. For example, watermarking or other digital signing means may be used to verify that the module has not been tampered with.

In step 310, portion-level verifications are created. Each of these portion-level verifications can be used to verify a portion of the software module as loaded into memory. Then, in order to dynamically authenticate that the software module as loaded into memory has not been tampered with, in step 320, a portion of the software module as loaded into memory is verified using the corresponding portion-level verification. For example, the portion loaded into memory may be hashed, and the hash compared with a previously computed hash of the corresponding portion of the raw PE file as modified with the changes an OS loader would apply in the absence of any tampering. In this way, verification of memory can occur without necessitating the entire software module to be loaded into memory.

Figure 4:
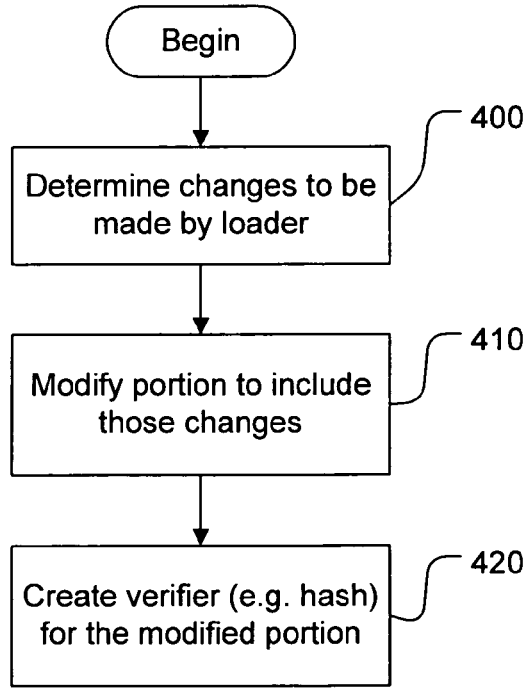
FIG. 4 is a flow diagram of the process of enabling verification of subsets of the module according to one embodiment of the invention

The portion-level verifications created in step 320 must be able to verify portions of the software module as loaded, not as stored on a persistent storage medium. A mechanism for portion-level verification according to one embodiment is shown in FIG. 4. In step 400, for a given portion, the changes which would be made by the OS loader upon loading the software module are determined. In step 410, the portion of the software module for which a verification is being created is modified according to those prospective changes to be applied by the OS loader. In step 420, a hash is created for the portion as modified. This hash is stored and used to verify portions of the software module which are loaded by the OS loader.

Scheduling of Portion-Level Verification

In one embodiment, in order for dynamic authentication to occur, the portion-level verifications occur according to a specific scheduling arrangement. Thus, where page-level hashes have been created and stored, a scheduling arrangement controls the verification of some or all of the pages in memory using the page-level hashes.

For example, according to one scheduling arrangement, where the module-level verification is followed by execution of the module, verification of the set of pages required to begin execution occurs. In one embodiment, the entire verification occurs before execution begins. In another embodiment, secure functionality of the module is contained in one or more portions of the software module. Only these portions are verified before the secure functionality is accessed. Later verification of other portions are scheduled after execution begins.

In addition, scheduling arrangements for continual re-verifications of pages being used may also be established. For example, a hot list of specific portions of the software module may be dynamically established and maintained, and the pages listed in the hot list may be reverified continually.

As another example, a periodic verification and reverification schedule may determine how pages are reverified, in order to amortize the verification cost. Pages to verify may be selected randomly (as is common in computing systems, such random selection may be in fact pseudo-random, as computers are generally deterministic). A tunable parameter may be included which allows the costs of verification to be controlled and managed, so it does not interfere with the responsiveness of the executing software module or other modules.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method implemented in a computing system of verifying integrity of a software module partially or fully loaded into memory of a computing environment for execution, comprising:
   a computing system verifying that said software module to be loaded has not been tampered with by using module-level verification; and
   upon verifying that the software module has not been tampered with, the computing system
      creating at least two portion-level verifications, each of said portion-level verifications allowing verification of a portion of said software module as loaded into memory, and
      using each of said portion-level verifications to verify a portion of said software module as loaded into memory,
   wherein said verifying that said software module to be loaded has not been tampered with by using module-level verification comprises taking a hash of the software module not incorporating changes made by an operating system loader and comparing the hash to a previously stored hash of the software module,
   wherein said creating at least two portion-level verifications comprises identifying two portions of the software module not incorporating changes made by an operating system loader and for each of at least two portions of the software module, modifying the portion to comprise loading changes implemented by an operating system loader in loading the portion, hashing the modified portion, and preserving the hash of the modified portion,
   wherein a first of the identified two portions of the software module contains secure functionality and a second of the identified two portions of the software module does not contain secure functionality, and wherein said using each of said portion-level verifications to verify a portion of said software module comprises:
      for the first of the identified two portions of the software module, prior to beginning executing the software module, the operating system loader loading the portion of said software module, hashing the loaded portion of said software module, comparing a result of hashing the loaded portion of said software module with the preserved hash of the modified portion, and
      for the second of the identified two portions of the software module, after beginning execution of the software module, the operating system loader loading the portion of said software module, hashing the loaded portion of said software module, comparing a result of hashing the loaded portion of said software module with the preserved hash of the modified portion; and
      for one of the first of the identified two portions and the second of the identified two portions that is identified in a hot list, continually re-verifying.

2. The method of claim 1, where said portion-level verifications are page-level verifications.

3. The method of claim 1, where said step of using each of said portion-level verifications to verify a portion of said software module as loaded into memory comprises:
   loading at least part of said software module into memory for execution; and
   verifying at least two portions of said software module as loaded into memory using said portion-level verifications.

4. The method of claim 3, where said step of verifying at least two portions of said software module occurs before said software module is executed.

5. The method of claim 1, where said step of using one of said portion-level verifications to verify a portion of said software module as loaded into memory comprises:
   maintaining a hot list of specific portions of said software module which have been loaded into memory; and
   verifying each portion on said hot list using said portion-level verifications.

6. The method of claim 1, where said step of using each of said portion-level verifications to verify a portion of said software module as loaded into memory comprises:
   verifying at least one portion of said software module containing code related to security functionality before said security functionality is utilized.

7. The method of claim 1, where said step of using each of said portion-level verifications to verify a portion of said software module as loaded into memory comprises:
   periodically verifying a selected portion from among said at least two portions of said software module.

8. The method of claim 7, where said selected portion is selected randomly from said at least two portions.

9. An article, comprising: at least one of an operating system, a computing memory having stored thereon a plurality of computer-executable instructions, a co-processing device, and a computing device carrying the computer executable instructions for performing the method of claim 1.

10. A computing system adapted to verify integrity of a software module partially or fully loaded into memory of a computing environment for execution, comprising:
   at least one computing processor;
   memory communicatively coupled with said at least one computing processor, said memory comprising instructions executable by said at least one computing processor for performing the following:
   verifying that said software module being loaded has not been tampered with by using said module-level verification; and
   upon verifying that the software has not been tampered with,
   creating at least two portion-level verifications, each of said portion-level verifications allowing verification of a portion of said software module as loaded into memory, and
   using each of said portion-level verifications to verify a portion of said software module as loaded into memory;
   wherein said verifying that said software module to be loaded has not been tampered with by using module-level verification comprises taking a hash of the software module not incorporating changes made by an operating system loader and comparing the hash to a previously stored hash of the software module,
   wherein said creating at least two portion-level verifications comprises identifying two portions of the software module not incorporating changes made by an operating system loader and for each of at least two portions of the software module, modifying the portion to comprise loading changes implemented by a loader in loading the portion, hashing the modified portion, and preserving the hash of the modified portion, wherein a first of the identified two portions of the software module contains secure functionality and a second of the identified two portions of the software module does not contain secure functionality, and wherein using each of said portion-level verifications to verify a portion of said software module as loaded into memory comprises:

for a first of the identified two portions of the software module, prior to beginning executing the software module, the operating system loader loading the portion of said software module, hashing the loaded portion of said software module, comparing a result of hashing the loaded portion of said software module with the preserved hash of the modified portion,and for the second of the identified two portions of the software module, after beginning execution of the software module, the operating system loader loading the portion of said software module, hashing the loaded portion of said software module, comparing a result of hashing the loaded portion of said software module with the preserved hash of the modified portion; and for one of the first of the identified two portions and the second of the identified two portions that is identified in a hot list, continually re-verifying;

further wherein said using each of said portion-level verifications to verify a portion of said software module comprises amortizing verifying the at least two-level portion verifications over an application session, and further wherein amortizing verifying the at least two-level portion verifications over an application session comprises managing verifying the at least two-level portion verification using a tunable parameter.

11. An article, comprising: at least one of an operating system, a computing memory having stored thereon a plurality of computer-executable instructions, a co-processing device, and a computing device carrying the computer executable instructions for performing the method of claim 1.

12. A computing system adapted to verify integrity of a software module partially or fully loaded into memory of a computing environment for execution, comprising:

at least one computing processor;

memory communicatively coupled with said at least one computing processor, said memory comprising instructions executable by said at least one computing processor for performing the following:

verifying that said software module being loaded has not been tampered with by using said module-level verification; and upon verifying that the software has not been tampered with, creating at least two portion-level verifications, each of said portion-level verifications allowing verification of a portion of said software module as loaded into memory, and using each of said portion-level verifications to verify a portion of said software module as loaded into memory;

wherein said verifying that said software module to be loaded has not been tampered with by using module-level verification comprises taking a hash of the software module not incorporating changes made by an operating system loader and comparing the hash to a previously stored hash of the software module, wherein said creating at least two portion-level verifications comprises identifying two portions of the software module not incorporating changes made by an operating system loader and for each of at least two portions of the software module, modifying the portion to comprise loading changes implemented by a loader in loading the portion, hashing the modified portion, and preserving the hash of the modified portion, wherein a first of the identified two portions of the software module contains secure functionality and a second of the identified two portions of the software module does not contain secure functionality, and wherein using each of said portion-level verifications to verify a portion of said software module as loaded into memory comprises:

for a first of the identified two portions of the software module, prior to beginning executing the software module, the operating system loader loading the portion of said software module, hashing the loaded portion of said software module, comparing a result of hashing the loaded portion of said software module with the preserved hash of the modified portion, and for the second of the identified two portions of the software module, after beginning execution of the software module, the operating system loader loading the portion of said software module, hashing the loaded portion of said software module, comparing a result of hashing the loaded portion of said software module with the preserved hash of the modified portion; and for one of the first of the identified two portions and the second of the identified two portions that is identified in a hot list, continually re-verifying;

further wherein said using each of said portion-level verifications to verify a portion of said software module comprises amortizing verifying the at least two-level portion verifications over an application session, and further wherein amortizing verifying the at least two-level portion verifications over an application session comprises managing verifying the at least two-level portion verification using a tunable parameter.

13. The computing system of claim 12, where said portion-level verifications are page-level verifications.

14. The computing system of claim 12, where portion level-verification comprises:

loading at least part of said software module into memory for execution; and verifying at least two portions of said software module as loaded into memory using said portion-level verifications.

15. The computing system of claim 14, where verifying at least two portions of said portions of said software module occurs before said software module is executed.

16. The computing system of claim 12, where using each of the portion-level verifications to verify a portion of said software module as loaded into memory comprises:

storing a hot list of specific portions of said software module which have been loaded into memory; and verifying each portion on said hot list using said portion-level verifications.

17. The computing system of claim 12, where using each of said portion-level verifications to verify a portion of said software module as loaded into memory comprises:

verifying at least one portion of said software module containing code related to security functionality before said security functionality is utilized.

18. The computing system of claim 12, where using each of said at least one of said portion-level verifications to verify a portion of said software module comprises:

periodically verifying a selected portion from among said at least two portions of said software module.

19. The computing system of claim 18, where said selected portion is selected randomly from said at least two portions.

20. The computing system of claim 18, where said selected portion is selected based on a factor selected from among the following: inclusion of said selected portion on a hot list; the time elapsed since the portion was last verified; and whether the portion had previously been verified.

21. An article, comprising:
a computing memory having stored thereon executable instructions that cause a computing system to perform operations comprising:
verifying that said software module to be loaded has not been tampered with by using module-level verification;
upon verifying that the software module has not been tampered with,
  creating at least two portion-level verifications, each of said portion-level verifications allowing verification of a portion of said software module as loaded into memory,
    using each of said portion-level verifications to verify a portion of said software module as loaded into memory,
  wherein said verifying that said software module to be loaded has not been tampered with by using module-level verification comprises taking a hash of the software module not incorporating changes made by an operating system loader and comparing the hash to a previously stored hash of the software module,
  wherein said creating at least two portion-level verifications comprises identifying two portions of the software module not incorporating changes made by an operating system loader and for each of at least two portions of the software module, modifying the portion to comprise loading changes implemented by an operating system loader in loading the portion, hashing the modified portion, and preserving the hash of the modified portion,
wherein a first of the identified two portions of the software module contains secure functionality and a second of the identified two portions of the software module does not contain secure functionality, and wherein said using each of said portion-level verifications to verify a portion of said software module comprises:
  for the first of the identified two portions of the software module, prior to beginning executing the software module, the operating system loader loading the portion of said software module, hashing the loaded portion of said software module, comparing a result of hashing the loaded portion of said software module with the preserved hash of the modified portion, and
  for the second of the identified two portions of the software module, after beginning execution of the software module, the operating system loader loading the portion of said software module, hashing the loaded portion of said software module, comparing a result of hashing the loaded portion of said software module with the preserved hash of the modified portion; and
  for one of the first of the identified two portions and the second of the identified two portions that is identified in a hot list, continually re-verifying,
said using each of said portion-level verifications to verify a portion of said software module comprises amortizing verifying the at least two-level portion verifications over an application session, and
said portion-level verifications being page-level verifications and including a scheduling arrangement controlling the verification of some or all of the pages in memory using page-level hashes.

* * * * *